(12) United States Patent
Ochi (10) Patent No.: US 11,858,123 B2
(45) Date of Patent: Jan. 2, 2024

(54) MACHINE TOOL HAND (71) Applicant: FANUC CORPORATION, Yamanashi (JP)

(72) Inventor: Osamu Ochi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 18/149,796

(22) Filed: Jan. 4, 2023

(65) Prior Publication Data
US 2023/0150144 A1 May 18, 2023

Related U.S. Application Data (62) Division of application No. 16/939,329, filed on Jul. 27, 2020, now Pat. No. 11,571,818.

(30) Foreign Application Priority Data

Aug. 9, 2019 (JP) .................................. 2019-147321
Jul. 3, 2020 (JP) .................................. 2020-115692

(51) Int. Cl.
B25J 15/00 (2006.01)
B23Q 7/04 (2006.01)
(Continued)

(52) U.S. Cl.
CPC .......... B25J 15/0023 (2013.01); B23Q 7/043 (2013.01); B23Q 11/1023 (2013.01);
(Continued)

(58) Field of Classification Search
CPC .. B23Q 7/043; B23Q 7/045; B23Q 2230/002; B25J 15/0028; B25J 15/086; Y10T 409/30392; Y10T 409/303976
(Continued)

(56) References Cited

U.S. PATENT DOCUMENTS 4,213,354 A * 7/1980 Dahinden .......... B23Q 11/1015
82/900
4,716,647 A * 1/1988 Winkler ................. B23Q 7/045
483/22
(Continued)

FOREIGN PATENT DOCUMENTS

CH 639585 A5 * 11/1983 .......... B25J 15/0226
CN 104057348 A 9/2014
(Continued)

OTHER PUBLICATIONS

EPO Machine Translation of DE-102008020489-A1, Oct. 29, 2009.*
(Continued)

Primary Examiner — Erica E Cadugan
Assistant Examiner — Michael Vitale
(74) Attorney, Agent, or Firm — Maier & Maier, PLLC (57) ABSTRACT Provided is a machine tool hand including a body portion that is mounted so as to be attachable to and detachable from a spindle of a machine tool, and that is provided with a flow path connected to a coolant-liquid supply path formed in the spindle; and two or more hand members that are attached to the body portion such that at least one of the hand members is pivotable about a prescribed axis, and that are capable of gripping an object therebetween by being closed. The flow path is provided with discharge ports via which a coolant liquid supplied from the coolant-liquid supply path is discharged toward surfaces of the hand members that are exposed to an outside, and a pressure of the coolant liquid causes an opening operation or a closing operation of the hand members.

7 Claims, 12 Drawing Sheets (51) Int. Cl.
    *B23Q 11/12*     (2006.01)
    *B23Q 11/10*     (2006.01)

(52) U.S. Cl.
    CPC ...... *B23Q 11/127* (2013.01); *B23Q 2230/002* (2013.01); *Y10T 409/30532* (2015.01); *Y10T 409/303976* (2015.01)

(58) Field of Classification Search
    USPC .................. 409/135, 136; 294/106, 198
    See application file for complete search history.

(56) References Cited

U.S. PATENT DOCUMENTS

| | | | | |
|---|---|---|---|---|
| 4,744,596 | A | * | 5/1988 | Hiller ............... B25J 15/0206 |
| | | | | 294/115 |
| 5,234,244 | A | | 8/1993 | Kim |
| 5,275,516 | A | * | 1/1994 | Liaw ............... B23Q 11/1023 |
| | | | | 279/20 |
| 5,277,689 | A | * | 1/1994 | Ruetschle ........ B25J 15/0206 |
| | | | | 483/902 |
| 5,803,886 | A | | 9/1998 | Schweizer |
| 7,033,955 | B2 | | 4/2006 | Nam et al. |
| 8,092,357 | B1 | | 1/2012 | Buus |
| 2009/0116915 | A1 | | 5/2009 | Kawasumi et al. |
| 2010/0123325 | A1 | * | 5/2010 | Maffeis ............... B25J 15/0226 |
| | | | | 294/199 |

FOREIGN PATENT DOCUMENTS

| | | | | |
|---|---|---|---|---|
| DE | 102008020489 | A1 | 10/2009 | |
| DE | 102008023813 | A1 | 11/2009 | |
| EP | 0791427 | A1 * | 8/1997 | ............ B23Q 7/045 |
| EP | 1637279 | A1 | 3/2006 | |
| JP | H08323672 | A | 12/1996 | |
| JP | H09327431 | A | 12/1997 | |
| JP | 2002096284 | A | 4/2002 | |
| JP | 2002160198 | A | 6/2002 | |
| JP | 2013067392 | A | 4/2013 | |
| JP | 3206020 | U | 8/2016 | |
| JP | 2017052055 | A | 3/2017 | |
| KR | 100391957 | B1 * | 7/2003 | ......... B25J 15/0028 |
| WO | 2005061183 | A2 | 7/2005 | |

OTHER PUBLICATIONS

"Product catalog of Mate-Han-Holder (Workpiece Handling Holder) for Machining Center & NC Lathes", Ujiseiko Limited, Retrieved from the internet in Jul. 2019, URL: http://www.c-max.cajp/jimtof/pdf/WorkpieceHandlingHolder.pdf; 8 pgs.

* cited by examiner

MACHINE TOOL HAND

CROSS-REFERENCE TO RELATED APPLICATIONS

This application is a divisional of U.S. patent application Ser. No. 16/939,329, which is based on Japanese Patent Applications Nos. 2019-147321 and 2020-115692, the contents of which are incorporated herein by reference.

FIELD

The present disclosure relates to a machine tool hand.

BACKGROUND

There is a known gripping device that drives a plurality of hand members so as to be opened and closed by utilizing a coolant liquid supplied to a spindle of a machining center (for example, see Publication of Japanese Examined Utility Model Registration No. 3206020).

This gripping device includes: a cylinder into which a coolant liquid supplied to a spindle is injected; a piston that is movably disposed in the cylinder and that is moved by the pressure of the coolant liquid; and a plurality of hand members that are pivotably coupled to the piston.

SUMMARY

An aspect of the present disclosure is a machine tool hand including: a body portion that is mounted so as to be attachable to and detachable from a spindle of a machine tool, and that is provided with a flow path connected to a coolant-liquid supply path formed in the spindle; and two or more hand members that are attached to the body portion such that at least one of the hand members is pivotable about a prescribed axis, and that are capable of gripping an object therebetween by being closed. The flow path is provided with discharge ports via which a coolant liquid supplied from the coolant-liquid supply path is discharged toward surfaces of the hand members that are exposed to an outside, and a pressure of the coolant liquid causes an opening operation or a closing operation of the hand members.

DETAILED DESCRIPTION

A machine tool hand 1 according to an embodiment of the present disclosure will be described below with reference to the drawings.

Figure 1:
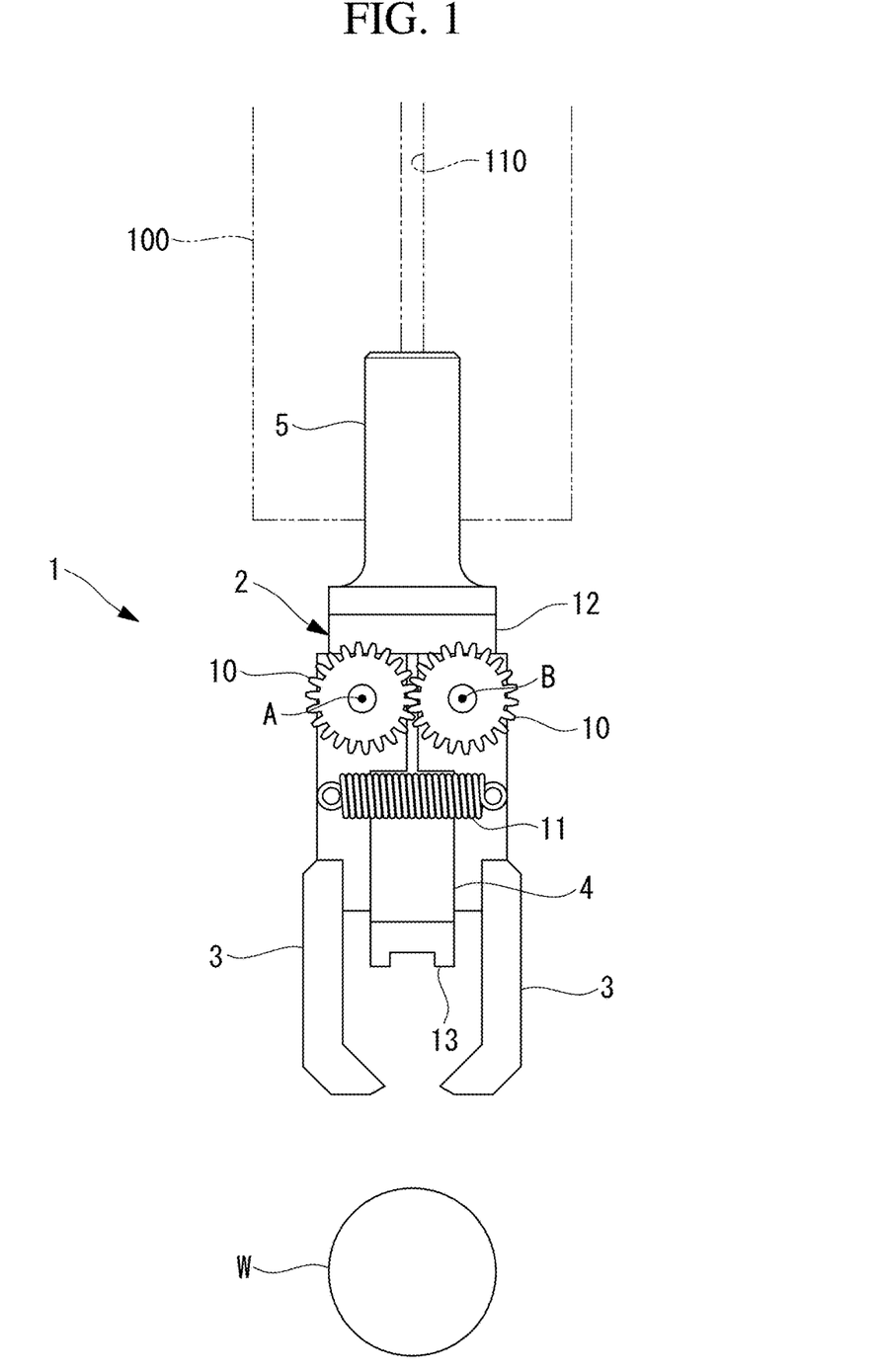
FIG. 1 is a front view showing a machine tool hand according to an embodiment of the present disclosure, in a state in which a pair of hand members are closed.
Figure 2:
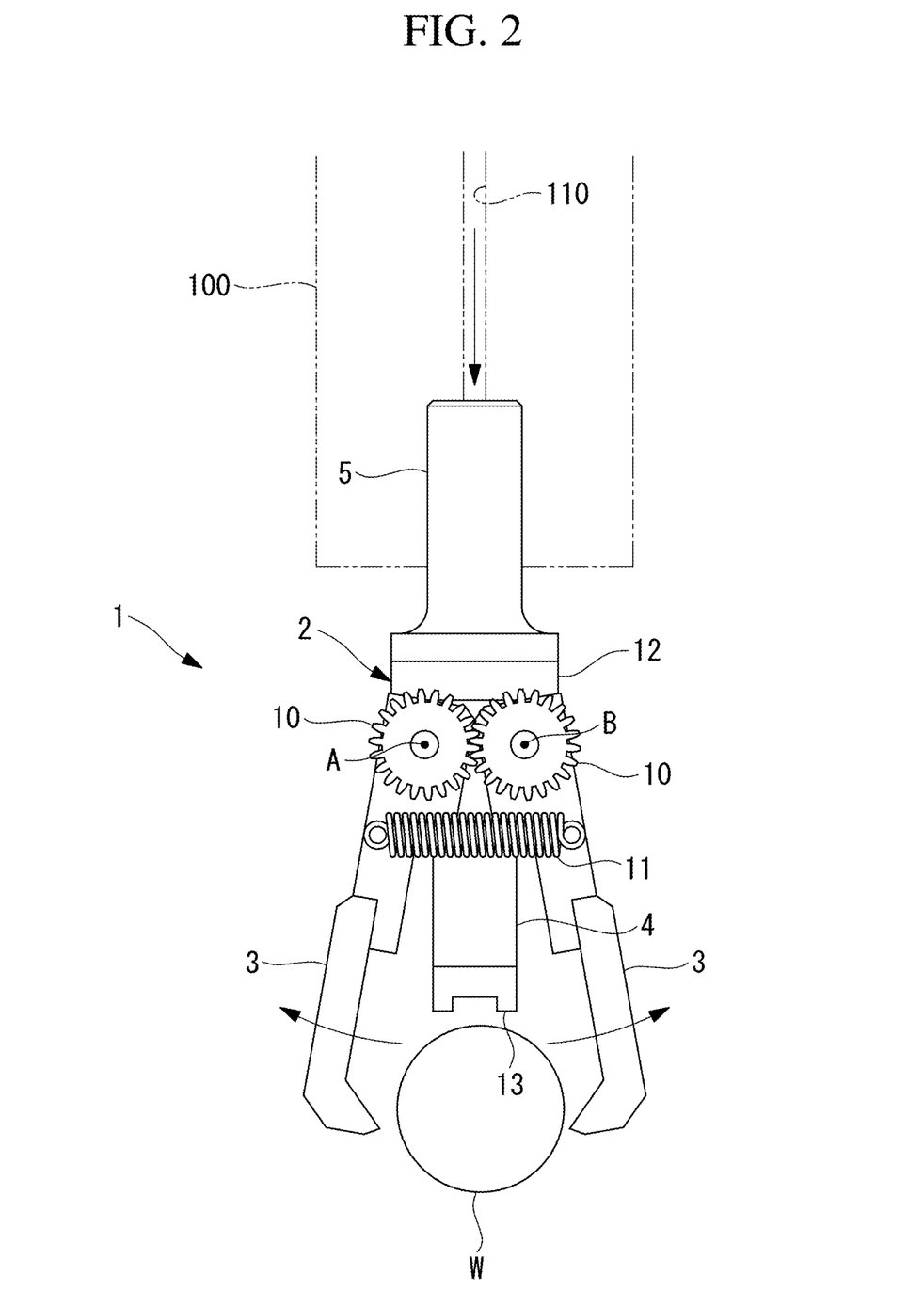
FIG. 2 is a front view showing the machine tool hand in FIG. 1, in a state in which the pair of hand members are opened.

As shown in FIGS. 1 and 2, the machine tool hand 1 according to this embodiment includes a body portion 2 and a pair of hand members 3.

Figure 4:
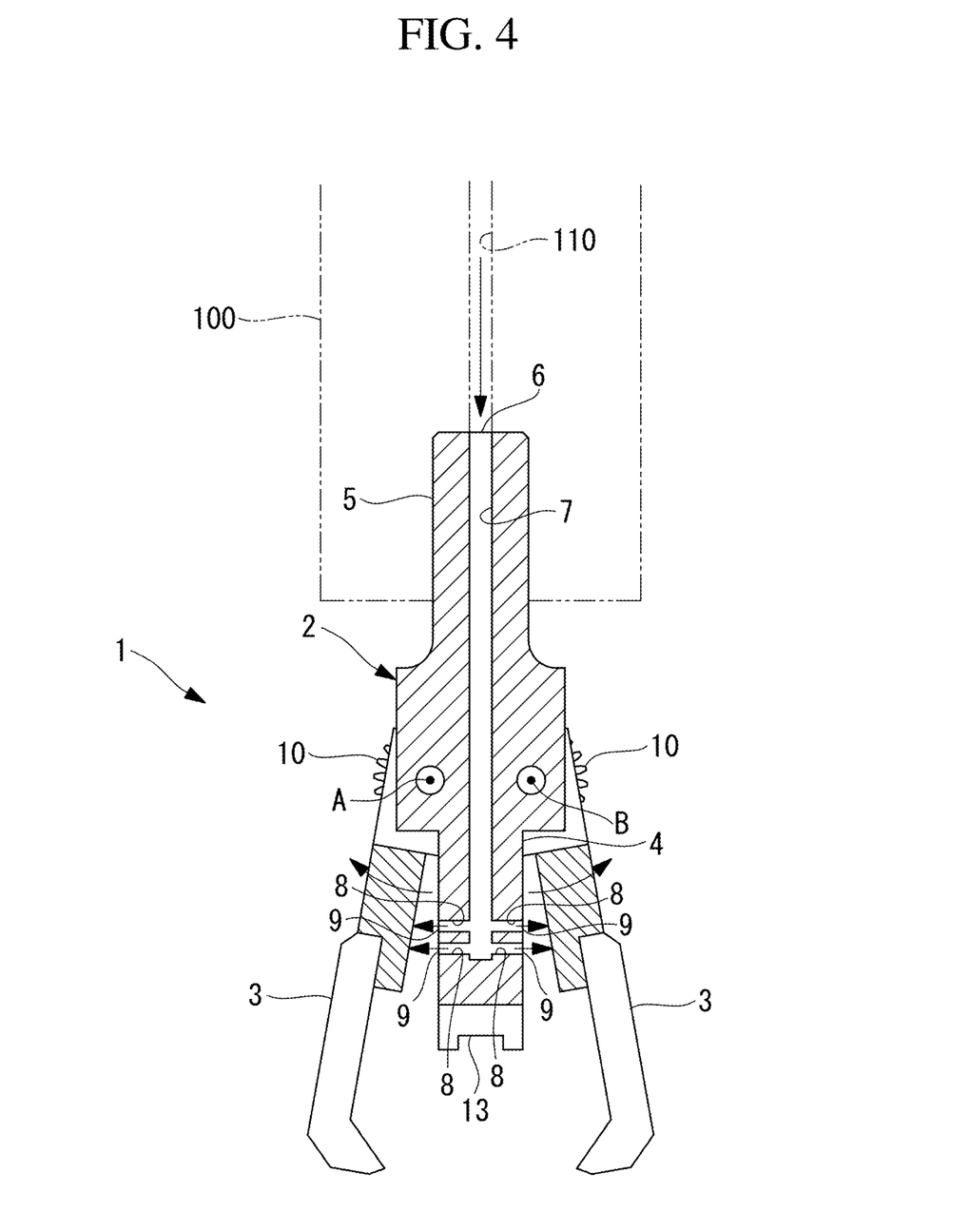
FIG. 4 is a longitudinal sectional view showing the machine tool hand in FIG. 2.

The body portion 2 includes: a distal end portion 4 that is formed in a cuboid block shape; and a cylindrical shaft portion 5 that is disposed closer to the base end than the distal end portion 4 is, and that is for mounting the body portion 2 so as to be attachable to and detachable from a spindle 100 of a machine tool. As shown in FIG. 4, the shaft portion 5 is provided with a flow path 7 that extends along a central axis from an opening 6 at one end. When the shaft portion 5 is attached to the spindle 100, the opening 6 is connected to a coolant-liquid supply path 110 provided in the spindle 100, and a coolant liquid supplied from the coolant-liquid supply path 110 is allowed to flow into the flow path 7.

The pair of hand members 3 are disposed on both sides of the distal end portion 4 of the body portion 2, and are individually attached to the body portion 2 so as to be pivotable about two parallel pivot axes (axes) A, B extending along a plane orthogonal to the central axis of the shaft portion 5.

As shown in FIG. 4, the flow path 7 provided in the body portion 2 is branched into branched flow paths 8 in two directions in the distal end portion 4. The branched flow paths 8 are individually branched in the directions toward the individual hand members 3. The branched flow paths 8 have discharge ports 9 opening at two locations on each side surface of the distal end portion 4. The total of the opening areas of the four branched flow paths 8 and the discharge ports 9 thereof is set to be substantially equal to the cross-sectional area of the flow path 7 in the shaft portion 5.

Gears 10 that rotate about the pivot axes A, B are fixed to the respective hand members 3. The gears 10 fixed to the two hand members 3 mesh with each other.

In addition, a coil spring (urging member) 11, which urges the hand members 3 in the closing direction by means of an elastic restoring force, is bridged between the two hand members 3.

In this embodiment, opposing side surfaces of the pair of hand members 3 are disposed so as to face the positions where these opposing side surfaces close off the discharge ports 9 provided in the distal end portion 4 of the body portion 2.

In a state shown in FIG. 1 in which the pair of hand members 3 are closed, the side surfaces of the individual hand members 3 are disposed closest to the discharge ports 9, at positions where the side surfaces substantially close off the individual discharge ports 9. In a state shown in FIG. 2 in which the pair of hand members 3 are opened, the side surfaces of the individual hand members 3 are slightly inclined so as to be separated from the discharge ports 9 as a result of the individual hand members 3 pivoting about the pivot axes A, B, and gaps are formed between the body portion 2 and the hand members 3.

The individual hand members 3 are constantly urged in the closing direction by means of the elastic restoring force of the coil spring 11. In other words, in a state in which a workpiece (object) W is not held between the hand members 3 and the coolant liquid is not supplied into the flow path 7, the side surfaces of the individual hand members 3 close the discharge ports 9 in the body portion 2 by means of the elastic restoring force of the coil spring 11.

Then, when the coolant liquid is supplied into the flow path 7, the individual hand members 3 are pushed by the coolant liquid discharged from the discharge ports 9 and are caused to pivot in directions in which the hand members 3 are separated from each other against the elastic restoring force of the coil spring 11. The pressure of the coolant liquid discharged from the discharge ports 9 is, for example, 0.4 MPa to 2 MPa.

In the figures, reference sign 12 indicates an end stopper that abuts against the hand members 3 at the open positions and that restricts further movement of the hand members 3 by means of elastic deformation. In addition, reference sign 13 indicates an elastic member, such as a sponge, that comes into contact with the workpiece W and is elastically deformed when the workpiece W is gripped.

The operation of the thus-configured machine tool hand 1 according to this embodiment will be described below. In the description hereinafter, since the machine tool hand 1 according to this embodiment is formed symmetric laterally, there will be described only for one side, and the description for the other side will be omitted.

The machine tool hand 1 according to this embodiment is, for example, stored as one of the tools in a tool magazine of a machine tool and is attached to the spindle 100 in place of another tool, as needed or periodically, by an automatic tool changing device (not shown) provided in the machine tool.

For example, when it is necessary to supply a workpiece W to a chuck provided on a rotary table, to change the orientation of a workpiece W, or the like, the machine tool hand 1 is attached to the spindle 100.

Then, in a state in which the machine tool hand 1 is attached to the spindle 100, with the hand members 3 thereof directed downward, the machine tool hand 1 is raised or lowered in accordance with an elevating operation of the spindle 100.

Figure 3:
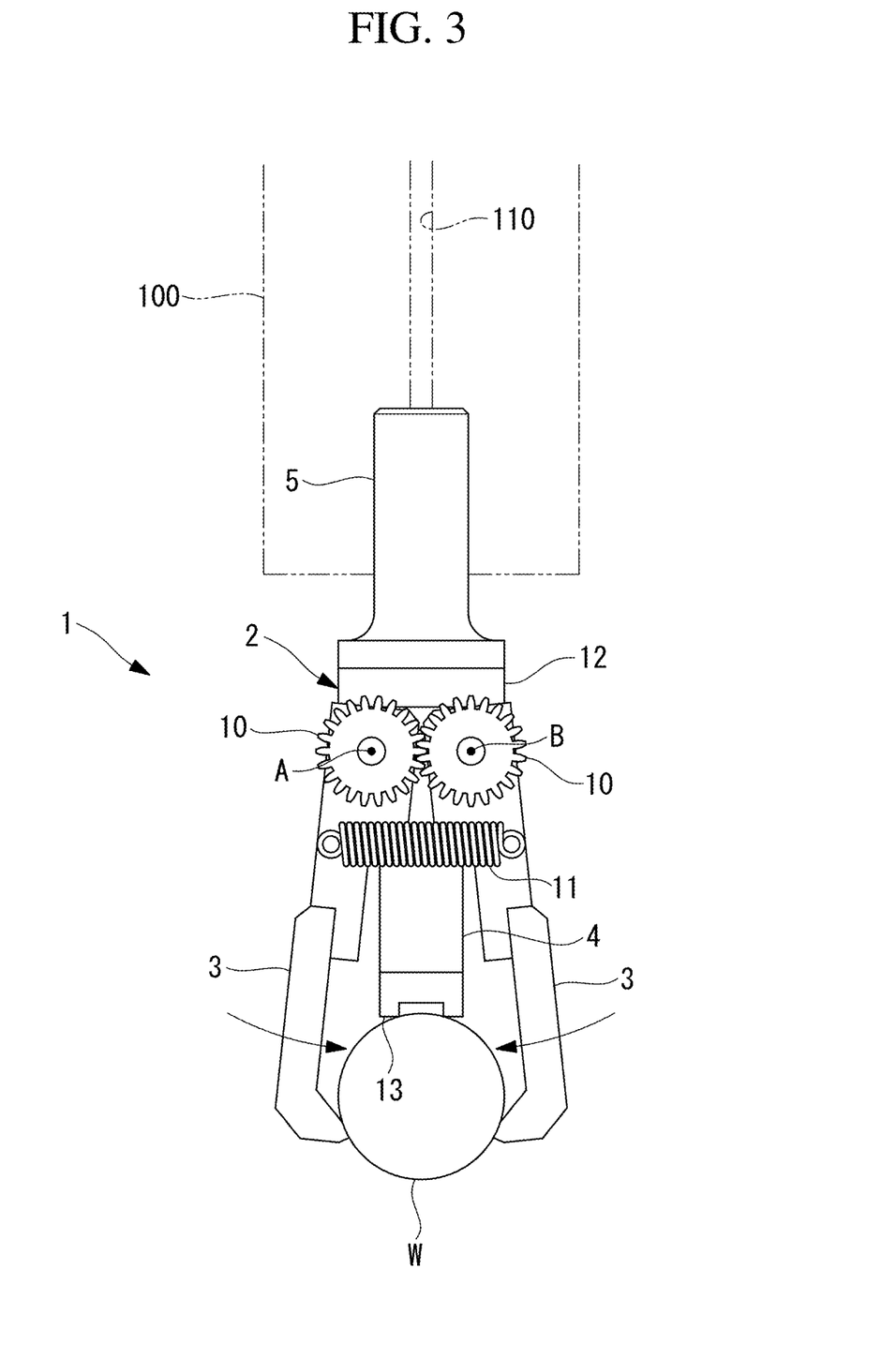
FIG. 3 is a front view showing a state in which a workpiece is gripped by the machine tool hand in FIG. 1.

As shown in FIG. 1, in the case of gripping a workpiece W disposed vertically below the machine tool hand 1, the machine tool hand 1 is lowered by lowering the spindle 100, and as shown in FIG. 2, the pair of hand members 3 are brought into an open state by supplying the coolant liquid from the spindle 100. Then, in a state in which the workpiece W is disposed between the pair of hand members 3, as shown in FIG. 3, the pair of hand members 3 are brought into a closed state by stopping the supply of the coolant liquid, thus allowing the workpiece W to be gripped.

In this case, with the machine tool hand 1 according to this embodiment, when the pair of hand members 3 are brought into the open state, the coolant-liquid supply path 110 utilized during processing of the workpiece W is utilized, and the coolant liquid is supplied into the flow path 7 in the body portion 2 from the coolant-liquid supply path 110 through the opening 6. By doing so, the coolant liquid supplied into the flow path 7 in the body portion 2 is discharged from the discharge ports 9 opening in two directions and presses the side surfaces of the individual hand members 3, thereby allowing the individual hand members 3 to pivot about the pivot axes A, B.

Because the flow path 7 in the body portion 2 is open to the outside at the discharge ports 9, the coolant liquid discharged from the discharge ports 9 flows along the side surfaces of the hand members 3 while pressing the side surfaces of the hand members 3, and flows downward from the distal ends of the hand members 3. The coolant liquid that has flowed down is recovered in a coolant tank (not shown) and is allowed to circulate in the same manner as in the processing.

Although fine chips or the like become mixed into the coolant liquid at this time, in this embodiment, the coolant liquid for opening and closing the hand members 3 is released to the outside from the discharge ports 9 of the flow path 7 in the body portion 2, and the hand members 3 are caused to pivot by the flow energy during the release. Therefore, because the coolant liquid is not supplied into a closed space, there is an advantage in that it is possible to perform handling, etc. of a workpiece W without causing a malfunction due to chip clogging even when fine chips or the like become mixed into the coolant liquid.

In addition, with the machine tool hand 1 according to this embodiment, the pair of hand members 3 are constantly urged in the closing direction by means of the elastic restoring force of the coil spring 11; thus, the hand members 3 can be easily brought into the closed state by stopping the supply of the coolant liquid. In addition, because the gears 10 meshing with each other are fixed to the pair of hand members 3, there is an advantage in that it is possible to place the gripping position of the workpiece W at the center as a result of the pair of hand members 3 pivoting by the same angles distributed from the center.

Figure 5:
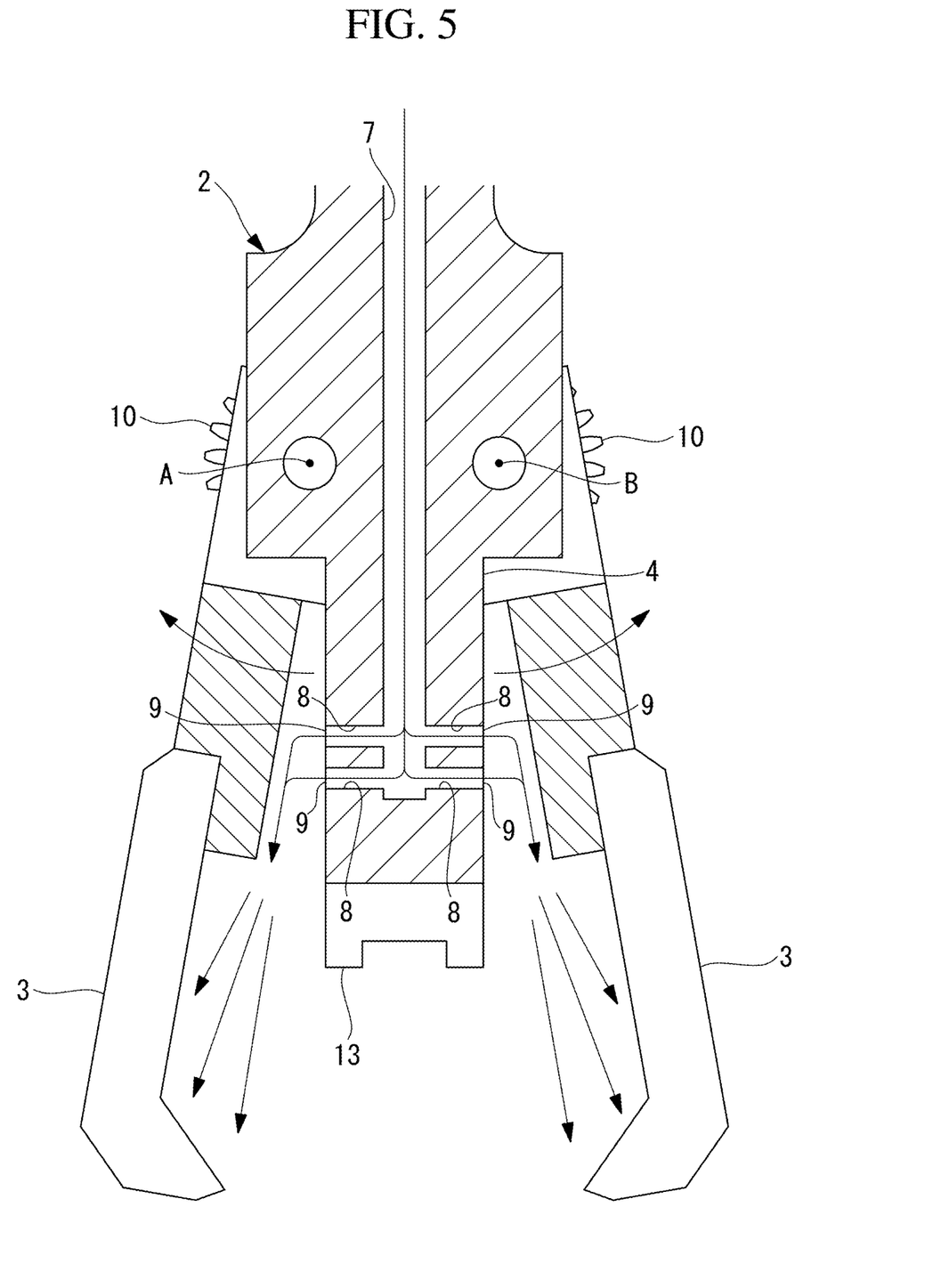
FIG. 5 is an enlarged longitudinal sectional view showing the flow of a coolant liquid in the machine tool hand in FIG. 2.

In addition, when the pair of hand members 3 are brought into the open state, as shown in FIGS. 4 and 5, the hand members 3 pivot about the pivot axes A, B, and the side surfaces pushed by the coolant liquid are each disposed so as to form an angle larger than 90° relative to the discharge direction. With this configuration, a guide means for the coolant liquid is formed, and the coolant liquid is allowed to flow along the side surfaces while being guided toward the distal ends of the hand members 3. As a result, there is an advantage in that portions for gripping the workpiece W can be washed with the coolant liquid every time the pair of hand members 3 are opened.

In addition, in this embodiment, the flow path 7 in the body portion 2 is branched into the four branched flow paths 8, and the cross-sectional area of each of the branched flow paths 8 and the discharge ports 9 is set to be ¼ of the cross-sectional area of the flow path 7. Thus, the cross-sectional area of flow does not change between the flow path 7 and the branched flow paths 8, and loss can be reduced.

Note that, in this embodiment, the side surfaces of the hand members 3 are pushed by the coolant liquid itself discharged from the discharge ports 9. Alternatively, as shown in FIGS. 6 and 7, spherical metal (e.g., steel) bodies (movable bodies) 15 movable in the branched flow paths 8 in the vicinity of the discharge ports 9 may be disposed.

Figure 6:
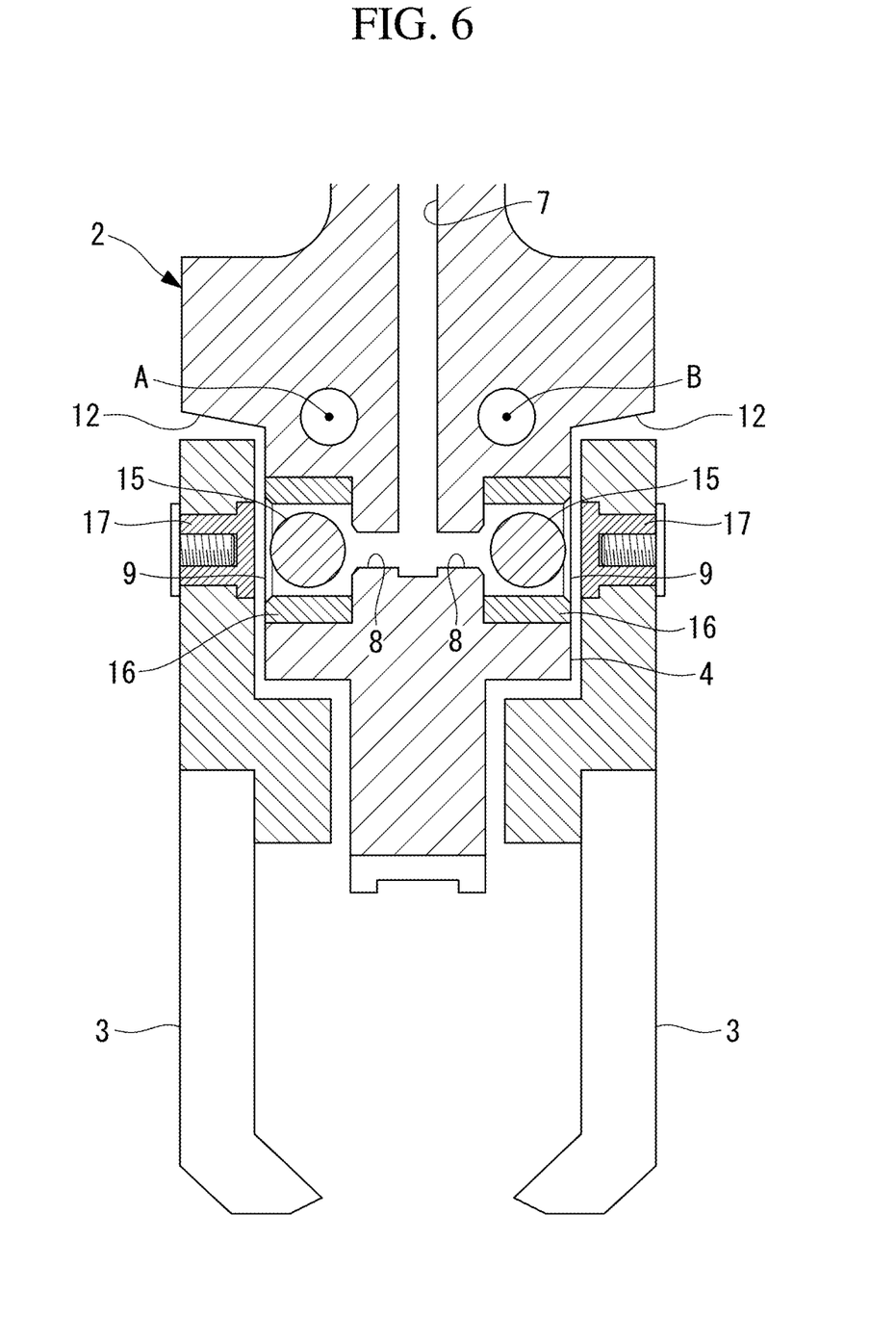
FIG. 6 is an enlarged longitudinal sectional view showing a first modification of the machine tool hand in FIG. 1, in a state in which a pair of hand members are closed.
Figure 7:
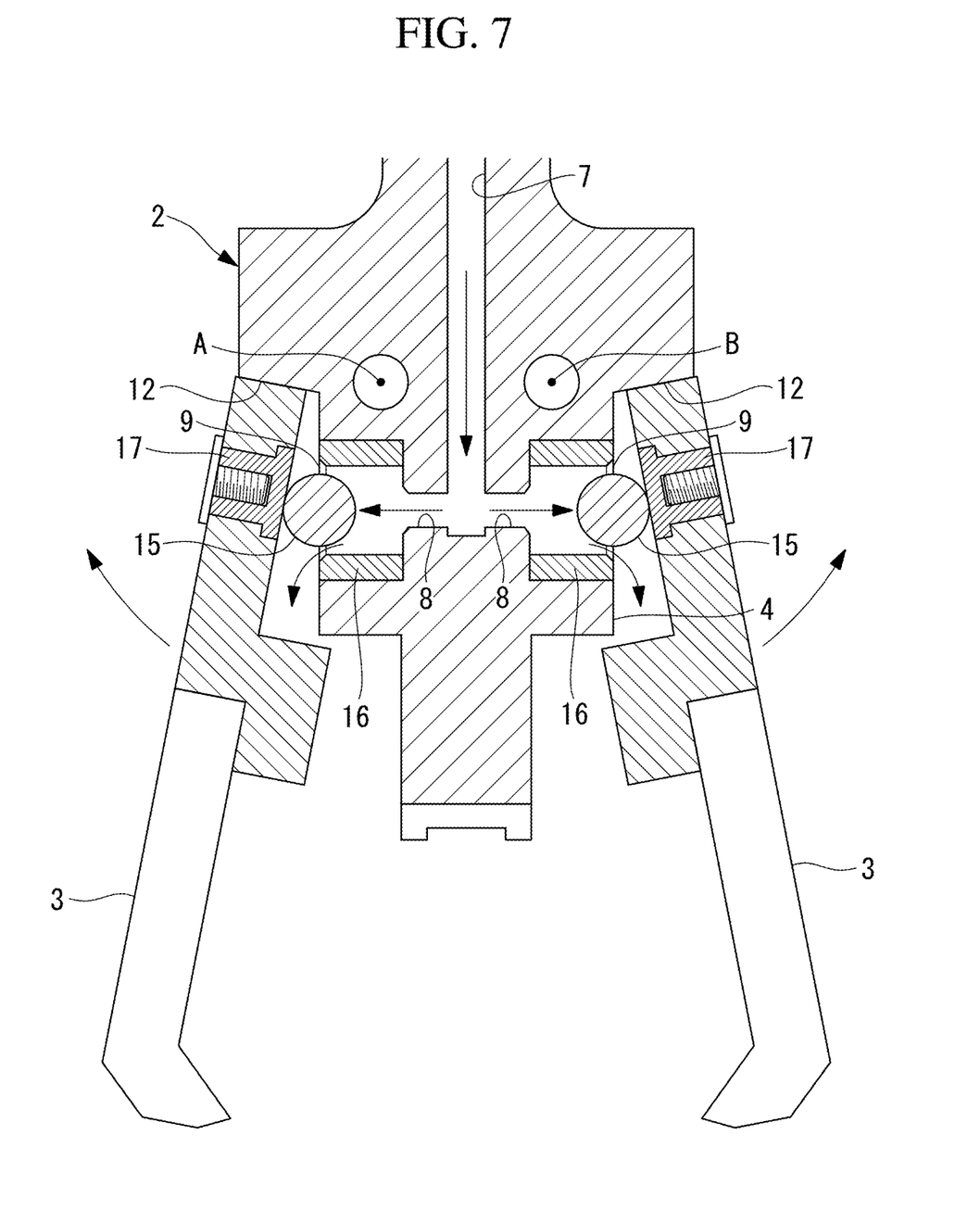
FIG. 7 is an enlarged longitudinal sectional view showing the machine tool hand in FIG. 6, in a state in which the pair of hand members are opened.

As shown in FIG. 6, the spherical body 15 has a diameter size smaller than an internal diameter of the branched flow path 8; and a gap of which the coolant liquid flows out is formed between the spherical body 15 and an inner surface of the branched flow path 8. In the figures, reference sign 16 indicates a cylindrical body that forms an inner wall of the branched flow path 8 in a movable range of the spherical body 15. Reference sign 17 indicates an abutting member embedded in the side surface of each of the hand members 3 opposing to the discharge ports 9.

In order to suppress abration of the body portion 2 and the hand members 3 caused by contacts with the spherical bodies 15 when the body portion 2 and the hand members 3 are made lighter in weight by using an aluminum alloy or the like, the cylindrical body 16 and the abutting member 17 are constituted by a hard material, for example, steel. The abutting members 17 are secured to the hand material 3 in a replaceable matter by engagement and disengagement of screws.

Reference sign 12 indicates an end stopper that restricts a pivot angle about pivot axis A or B of the hand members 3. The end stopper 12 according to this embodiment stops pivoting of the hand members 3 by abutting the hand members 3 at a pivot angle where a discharge amount of the spherical body 15 from the discharge port 9 is equal to or less than a hemisphere. In FIGS. 6 and 7, illustrations of the coil spring 11 are omitted.

When the coolant liquid is supplied into the flow path 7 from the coolant-liquid supply path 110, a portion of the coolant liquid branched to the two branched flow paths 8 pushes the spherical body 15 to move the spherical body 15 to a side of the discharge port 9, and the remainder is discharged to the outside from the discharge port 9 via the gap between the spherical body 15 and the inner surface of the branched flow path. Each of the spherical bodies 15 pushed by means of a pressure of the coolant liquid pushes the corresponding abutting member 17 of the corresponding hand member 3 by protruding from the corresponding discharge port 9 to the outside, thus causing the hand members 3 to pivot about the respective pivot axes A, B. By doing so, distal ends of the two hand members 3 are opened.

Since the center of the spherical body 15 is held at the inner side than the discharge port 9, a minimum value of the coolant-liquid communication cross-sectional area formed by the gap between the inner surface of the branched flow path 8 and the spherical body 15 remains constant without depending on the pivot angle of the corresponding hand member 3. That is, since the pressure applied to the spherical body 15 from the coolant liquid does not vary by the pivot angle of the corresponding hand member 3, the hand members 3 can be opened with a large stable force only by increasing the pressure of the coolant liquid. As a result, there are advantages in that a spring rigidity can be improved, a gripping force for the workpiece W can be improved, and therefore a stable handling can be realized.

In addition, by providing the gap around the spherical body 15, the coolant liquid can be discharged to the outside from the corresponding discharge port 9 without confining the coolant liquid in the flow path 7. By doing so, it is possible to prevent malfunction caused by clogging with chips or the like contained in the coolant liquid.

In addition, an amount of the cooling liquid discharged from the discharge port 9, of the coolant liquid supplied into the flow path 7, can be restricted by means of the corresponding spherical body 15. By doing so, there are advantages in that it can be prevented to discharge a large amount of the coolant liquid when the hand members 3 are opened, and an operator can easily confirm the state of the hand members 3 and the workpiece W visually.

In the above aspect, a spherical shape was illustrated as a shape of the movable object, however, it is not limited thereto. An arbitrary shape, such as a columner shape, a shell-type shape, or the like, may be employed. Even when the columner shape or the shell-type shape is employed, a posture change of the movable body can be suppressed, and the minimum value of the communication cross-sectional area formed by the gap between the inner surface of the branched flow path 8 and the movable body 15 can remain substantially constant.

Note that the gears 10 for synchronizing pivoting of the two hand members 3 need not be provided in this embodiment. In addition, although a case in which the two hand members 3 are both caused to pivot about the pivot axes A, B has been illustrated as an example, one of the hand members 3 may be fixed and only the other one may be caused to pivot. This configuration also allows gripping of the workpiece W.

In addition, although the machine tool hand 1 including the pair of hand members 3 has been illustrated as an example in this embodiment, alternatively, the present invention may be applied to a machine tool hand 1 including three or more hand members 3.

In addition, although four branched flow paths 8 are provided in this embodiment, alternatively, it suffices that two or more branched flow paths 8 be provided for causing two or more hand members 3 to pivot.

In addition, the hand members 3 may have any shape, and a plurality of machine tool hands 1 having different shapes may be prepared according to the shapes of workpieces W to be gripped.

Figure 8:
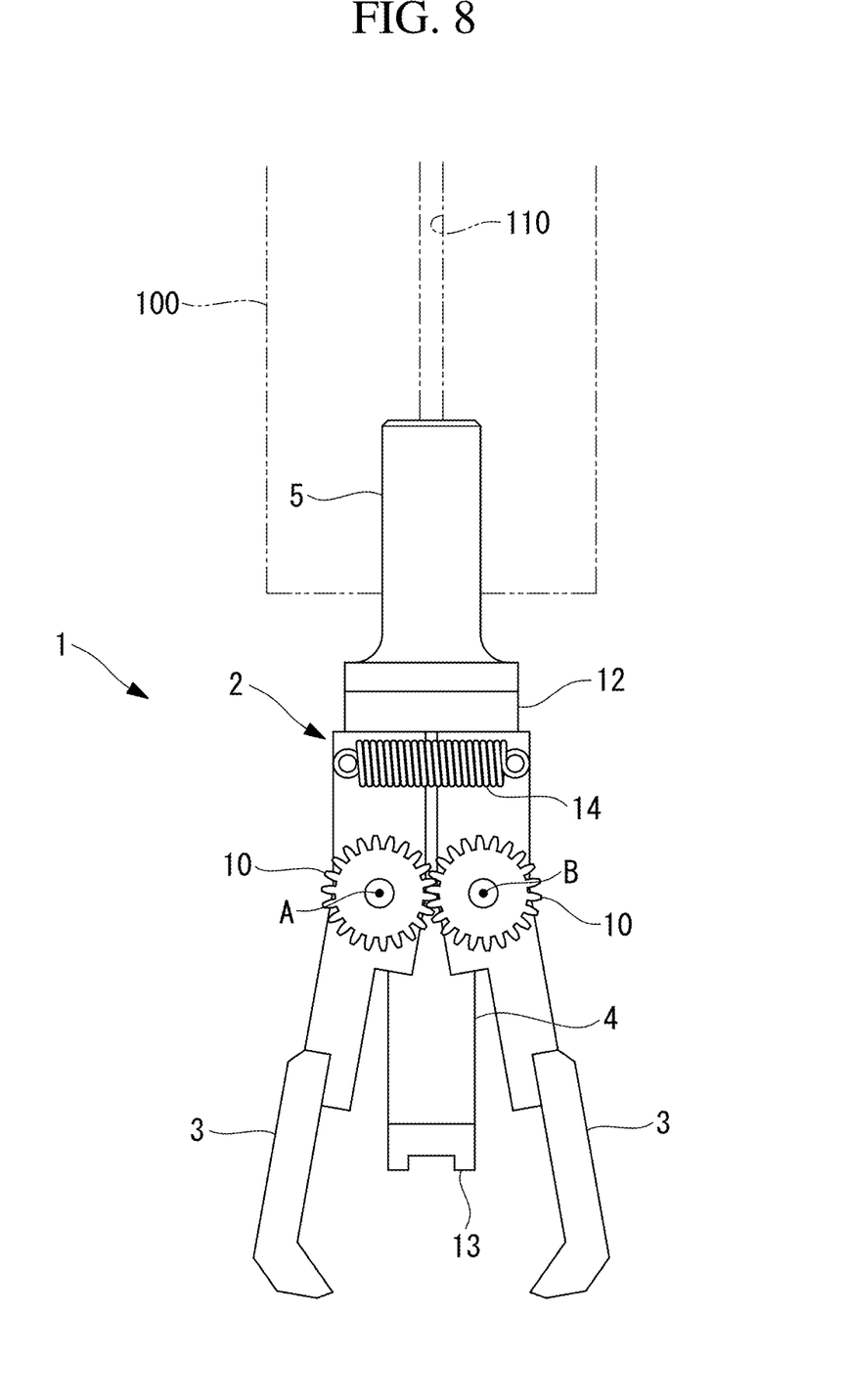
FIG. 8 is a front view showing a second modification of the machine tool hand in FIG. 1, in a state in which a pair of hand members are opened.
Figure 9:
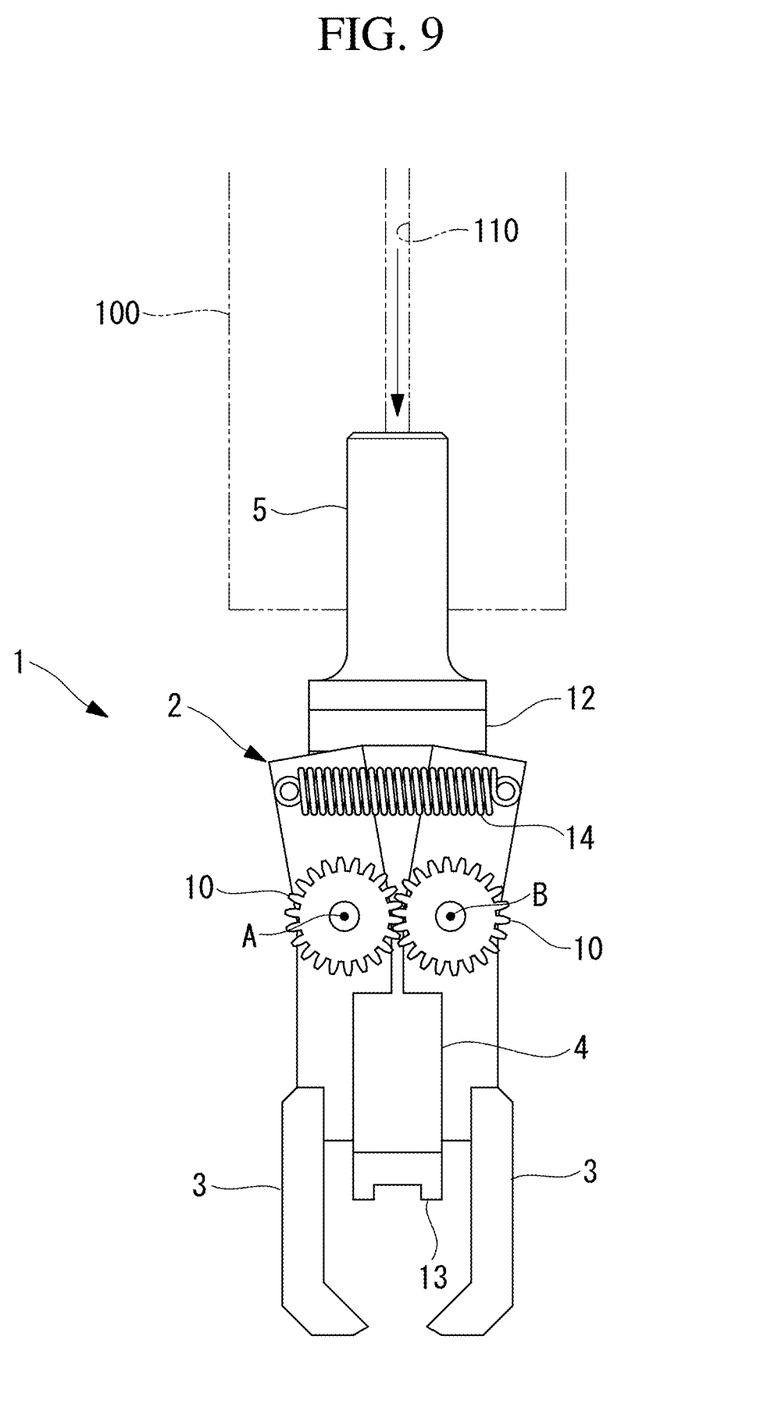
FIG. 9 is a front view showing the machine tool hand in FIG. 8, in a state in which the pair of hand members are closed.
Figure 10:
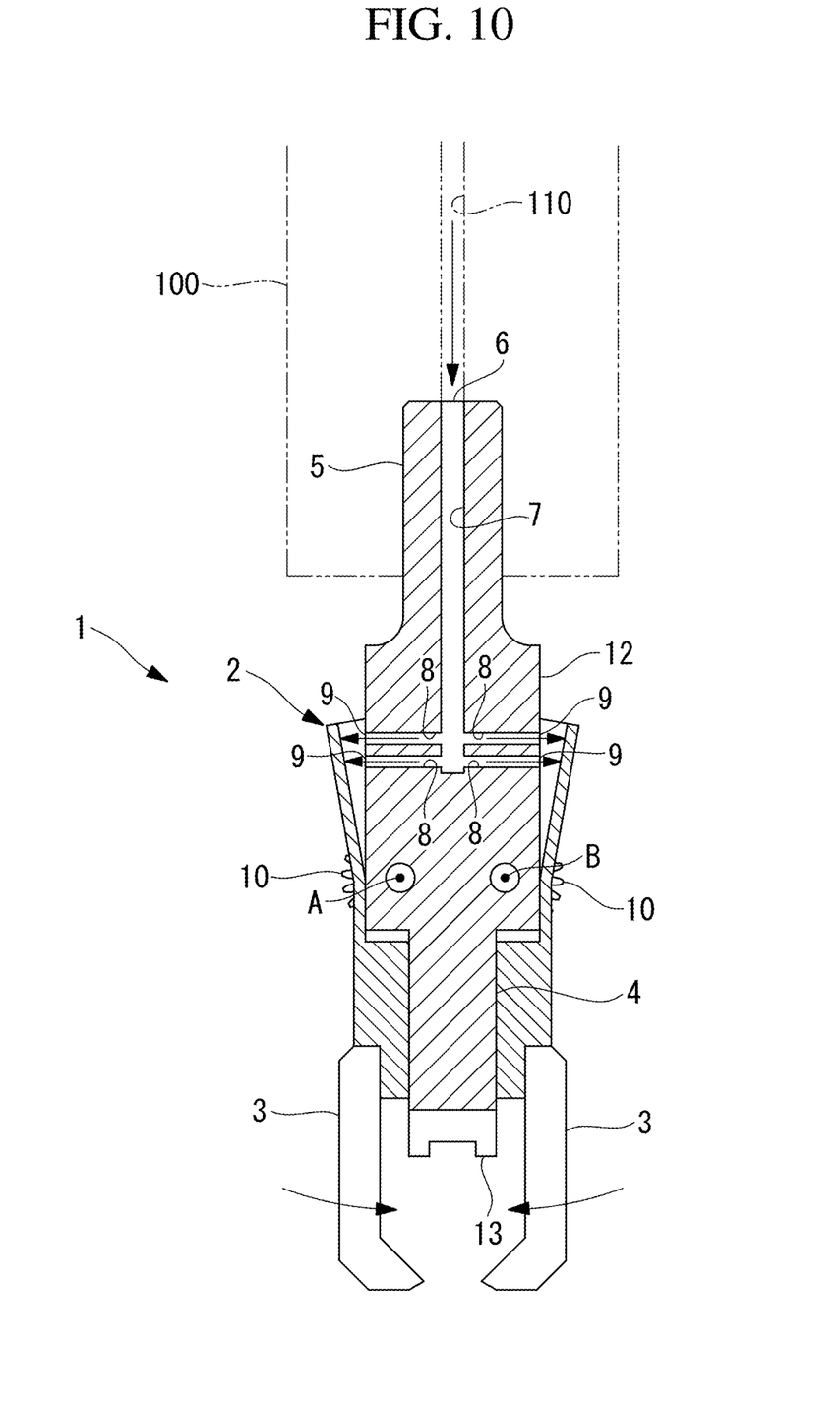
FIG. 10 is a longitudinal sectional view showing the machine tool hand in FIG. 9.

In addition, although the coolant liquid is supplied in the case of opening the hand members 3 in this embodiment, alternatively, as shown in FIGS. 8 to 10, the coolant liquid may be supplied when the hand members 3 are to be closed. In this case, a coil spring (urging member) 14 that constantly urges the hand members 3 in the opening directions may be employed.

Next, a machine tool hand 20 according to another embodiment of this disclosure will be described below. In the description of this embodiment, identical reference signs are assigned to portions having configurations common to those in the machine tool hand 1 according to the above embodiment, and a description thereof will be omitted.

Figure 11:
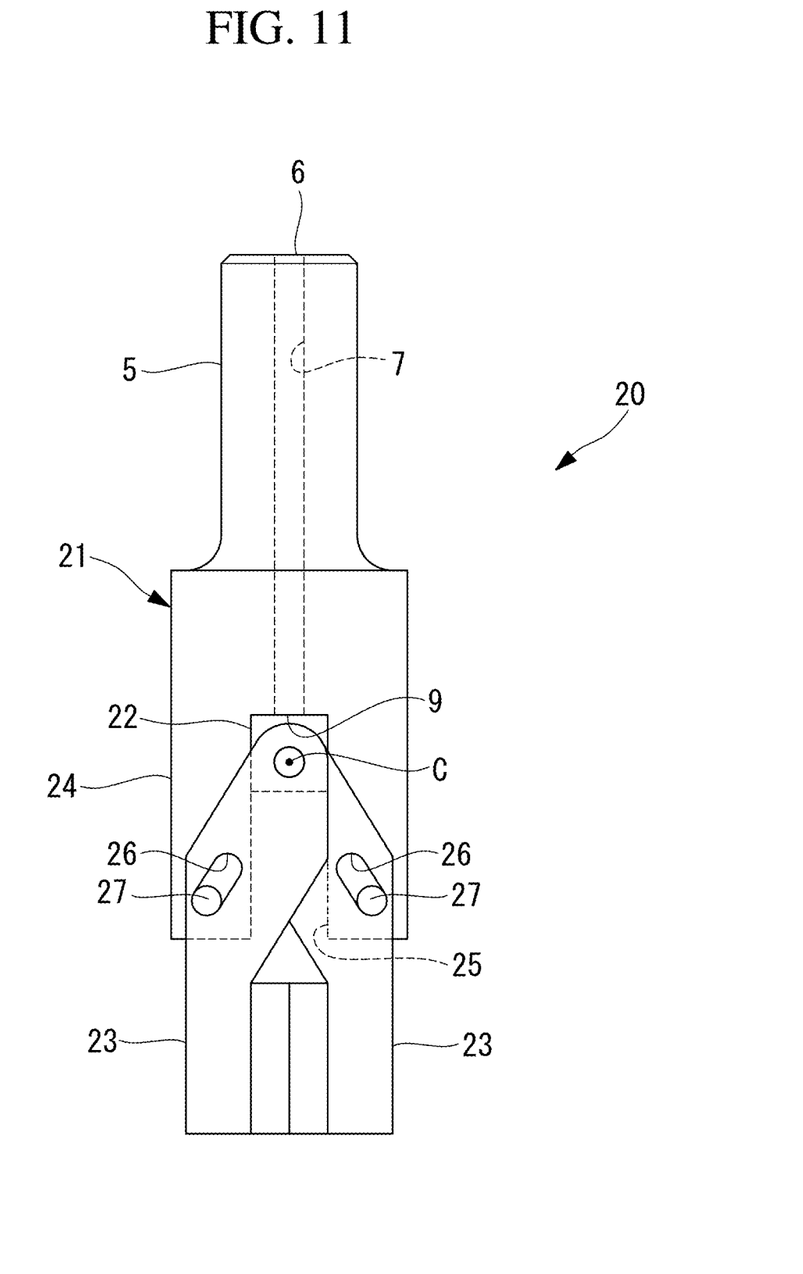
FIG. 11 is a front view showing a machine tool hand according to another embodiment of the present disclosure, in a state in which a pair of hand members are closed.

As shown in FIG. 11, the machine tool hand 20 according to this embodiment includes a body portion 21, a movable member 22, and a pair of hand members 23.

A distal end portion 24 of the body portion 21 is provided with a groove 25 that is arranged at the center of the width direction and that extends along the central axis of the shaft portion 5 from an end portion opposite to the shaft portion 5. The flow path 7, which extends along the central axis of the shaft portion 5 from the opening 6 at one end of the shaft portion 5, is provided with the discharge port 9 at a groove bottom of the groove 25.

The movable member 22 is disposed inside the groove 25 and is supported so as to be movable only in a direction along the central axis of the shaft portion 5 with respect to the distal end portion 24. A coil spring (urging member) which is not shown is bridged between the movable member 22 and the distal end portion 24. The movable member 22 is constantly urged in a direction closer to the discharge port 9 by means of the elastic restoring force of the coil spring.

The movable member 22 is moved closer to the groove bottom, thus being located at a position where the discharge port 9 is closed.

The pair of hand members 23 are supported to the movable member 22 in such a way that each proximal end thereof can pivot about a pivot axis (axis) C perpendicular to the central axis of the shaft portion 5. At an intermediate position of each of the hand members 23, an elongated guide hole 26 is provided so as to obliquely extend toward a direction of the distal end of the corresponding hand member 23 and a direction away from the central axis of the shaft portion 5.

A pin 27 that is provided on a side surface of the distal end portion 24 and that extends parallel to the pivot axis C, is inserted into each of the guide holes 26.

The operation of the thus-configured machine tool hand 20 according to this embodiment will be described below.

When the coolant liquid is supplied into the flow path 7, the coolant liquid flows and is discharged toward the movable member 22 from the discharge port 9. The discharged coolant liquid is sprayed into the movable member 22 that is being disposed at the position where the discharge port 9 is closed. By doing so, the movable member 22 is moved toward a direction away from the discharge port 9 along the central axis of the shaft portion 5.

Figure 12:
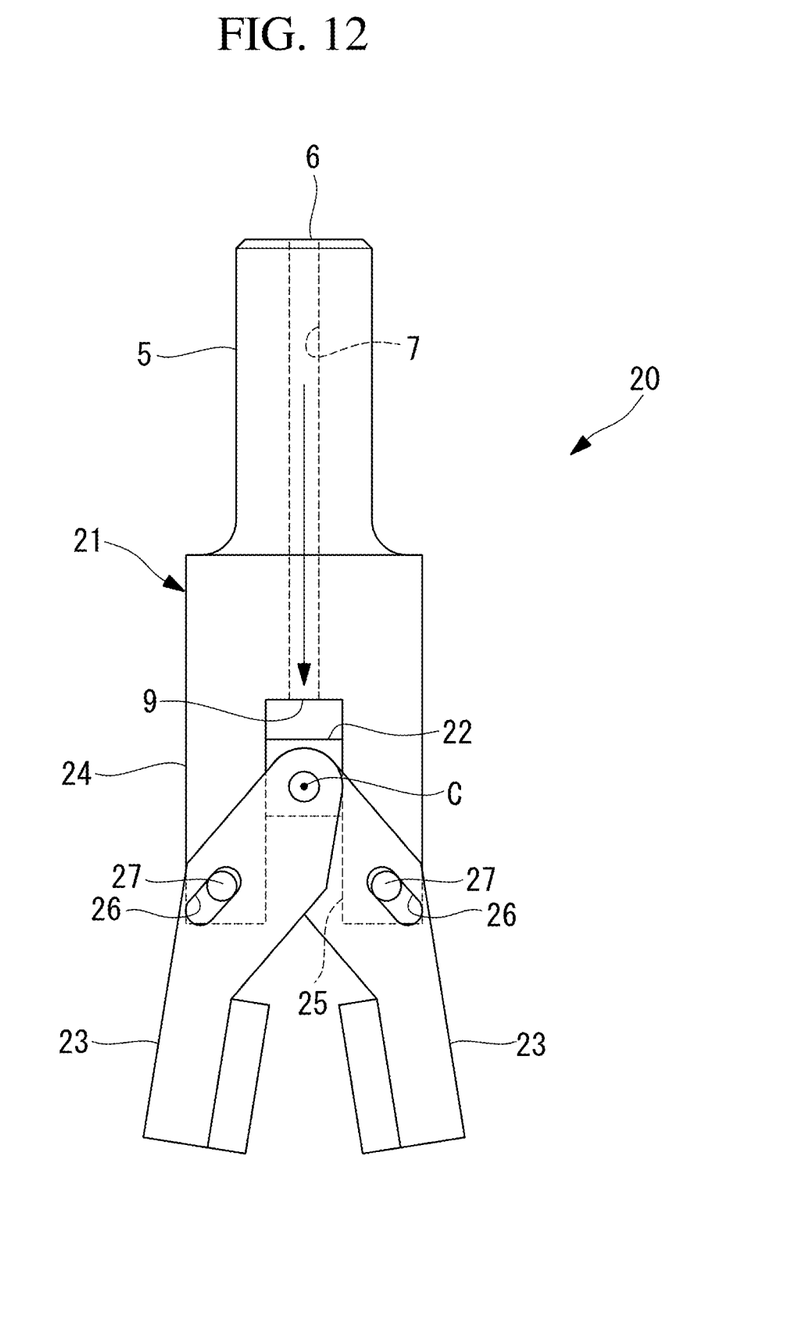
FIG. 12 is a front view showing the machine tool hand in FIG. 11, in a state in which the pair of hand members are opened.

In response to the movement of the movable member 22, each of the hand members 23 connected to the movable member 22 is moved along a longitudinal direction of the corresponding guide hole 26 with respect to the corresponding pin 27 secured at the distal end portion 24. By doing so, as shown in FIG. 12, the hand members 23 pivot about the pivot axis C, and thus the distal ends of the hand members 23 are opened.

When the supply of the coolant liquid is stopped, the movable member 22 is pulled back toward the direction closer to the discharge port 9 by means of the elastic restoring force of the coil spring. By doing so, in response to the movement of the movable member 22, each of the hand members 23 pivots in a direction in which the distal end is closed. Thereby, it is possible to grip the workpiece W between the hand members 23.

Thus, similarly to the machine tool hand 1 according to the first embodiment, the machine tool hand 20 according to this embodiment can also open and close the pair of hand members 23 by means of the coolant liquid discharged from the discharge port 9. There is an advantage in that, even when fine chips or the like become mixed into the coolant liquid, by releasing the coolant liquid to the outside from the discharge port 9, it is possible to perform handling, etc. of the workpiece W without causing a malfunction due to chip clogging.

In addition, it is possible to cleanse the hand members 23 with the coolant liquid discharged from the discharge port 9 flowing along the surface of the hand members 23 every time the pair of hand members 23 are opened.

Note that, in this embodiment, the case where the hand members 23 are opened by discharging the coolant liquid was illustrated. Reversely, the hand members 23 may be closed by discharging the coolant liquid.

The invention claimed is:

1. A machine tool hand comprising:
    a body portion comprising a flow path, the body portion configured to be detachably mounted to a spindle of a machine tool and the flow path configured to fluidically connect with a coolant-liquid supply path formed in the spindle;
    a plurality of hand members which are attached to the body portion such that at least one of the plurality of hand members is pivotable about a prescribed axis; and
    a movable body configured to push a first of the plurality of hand members,
    wherein the plurality of hand members are capable of gripping an object therebetween when closed,
    wherein the flow path is provided with discharge ports via which a coolant liquid supplied from the coolant-liquid supply path is discharged from the body portion to impinge upon surfaces of the plurality of hand members, the surfaces being disposed to an outside of the body portion,
    wherein the movable body is arranged within a first of the discharge ports such that the coolant liquid pushes the movable body against the first of the plurality of hand members, causing the first of the plurality of hand members to open, and such that a remainder of the coolant liquid passes around the movable body as the coolant exits the body portion through the first of the discharge ports.

2. The machine tool hand according to claim 1, wherein the movable body is a spherical body.

3. The machine tool hand according to claim 1, further comprising an elastic member which opposes, through an elastic restoring force, movement of the movable body.

4. The machine tool hand according to claim 1, wherein, when the plurality of hand members are open, the surfaces that are disposed to the outside of the body portion are angled to guide the coolant liquid towards a distal end of the two or more hand members.

5. The machine tool hand according to claim 4, wherein, when the plurality of hand members are open, the surfaces form an angle larger than 90 degrees relative to a discharge direction of the discharge ports.

6. The machine tool hand according to claim 1, further comprising:
    a second movable body configured to push a second of the plurality of hand members,
    wherein the second movable body is arranged within a second of the discharge ports such that the coolant liquid pushes the second movable body against the second of the plurality of hand members, causing the second of the plurality of hand members to open, and such that a remainder of the coolant liquid passes around the second movable body as the coolant exits the body portion through the second of the discharge ports.

7. A machine tool comprising:
    a spindle, and
    the machine tool hand according to claim 1, wherein the machine tool hand is able to be attached to the spindle in place of another tool.

* * * * *